United States Patent [19]

Carnahan et al.

[11] Patent Number: 6,087,293
[45] Date of Patent: Jul. 11, 2000

[54] SUPPORTED CATALYST CONTAINING TETHERED CATION FORMING ACTIVATOR

[75] Inventors: Edmund M. Carnahan, Fresno, Tex.; Michael J. Carney, Eldersburg, Md.; David R. Neithamer; Peter N. Nickias, both of Midland, Mich.; Keng-Yu Shih, Columbia, Md.; Lee Spencer, Pearland, Tex.

[73] Assignees: The Dow Chemical Company, Midland, Mich.; W.R. Grace & Co.-Conn., Columbia, Md.

[21] Appl. No.: 09/117,470

[22] PCT Filed: Oct. 25, 1996

[86] PCT No.: PCT/US96/17140

§ 371 Date: Mar. 2, 1998

§ 102(e) Date: Mar. 2, 1998

[87] PCT Pub. No.: WO97/19959

PCT Pub. Date: Jun. 5, 1997

Related U.S. Application Data

[60] Provisional application No. 60/007,609, Nov. 27, 1995, abandoned.

[51] Int. Cl.$^7$ .............................. B01J 31/00; C08F 4/44; C08F 4/06
[52] U.S. Cl. ................ 502/158; 502/150; 502/152; 502/155; 502/202; 526/128; 526/130; 526/134; 526/160; 526/943
[58] Field of Search .................... 502/150, 152, 502/155, 158, 202; 526/128, 130, 134, 160, 943

[56] References Cited

U.S. PATENT DOCUMENTS

| | | | |
|---|---|---|---|
| 5,455,214 | 10/1995 | Furtek et al. | 502/152 |
| 5,543,481 | 8/1996 | Takeuchi et al. | 526/134 |
| 5,627,246 | 5/1997 | Langhauser et al. | 502/117 |
| 5,643,847 | 7/1997 | Walzer, Jr. | 502/117 |
| 5,801,113 | 9/1998 | Jejelowo et al. | 502/104 |
| 5,807,938 | 9/1998 | Kaneko et al. | 502/152 |
| 5,834,393 | 11/1998 | Jacobsen et al. | 502/152 |
| 5,846,895 | 12/1998 | Gila et al. | 502/107 |
| 5,885,924 | 3/1999 | Ward | 502/402 |
| 5,939,347 | 8/1999 | Ward et al. | 502/202 |
| 5,972,823 | 10/1999 | Walzer, Jr. | 502/152 |

FOREIGN PATENT DOCUMENTS

| | | |
|---|---|---|
| WO 93/11172 | 6/1993 | WIPO . |
| WO 96/04319 | 2/1996 | WIPO . |
| WO 96/23005 | 8/1996 | WIPO . |
| WO 96/28480 | 9/1996 | WIPO . |
| WO 96/41808 | 12/1996 | WIPO . |

OTHER PUBLICATIONS

A.R. Siedel et al., Makromol.Chem., Macromol. Symp., vol. 66, pp. 215–224, Feb. 1993.
S. Collins et al., Macromolecules, vol. 25, No. 6, pp. 1780–1785, 1992.
R. Quyoum et al., J. Am. Chem. Soc., vol. 116, No. 14, pp. 6435–6436, 1994.

*Primary Examiner*—Mark L. Bell
*Assistant Examiner*—J. Pasterczyk

[57] ABSTRACT

A support for use in preparing supported catalysts for addition polymerizations comprising the reaction product of: (A) an inorganic oxide material comprising reactive surface hydroxyl groups, at least some of said hydroxyl groups optionally having been functionalized an converted to a reactive silano moiety corresponding to the formula: —OSiR$_2$H, wherein R, independently each occurrence, is hydrogen C$_{1-20}$ hydrocarbyl, or C$_{1-20}$ hydrocarbyloxy, said inorganic oxide or functionalized derivative thereof comprising less than 1.0 mmol of reactive surface hydroxyl functionality per gram, and (B) an activator compound comprising: b$_1$) a cation which is capable of reacting with a transition metal compound to form a catalytically active transition metal complex, and b$_2$) a compatible anion containing at least one substituent able to react with the inorgnaic oxide, with residual hydroxyl functionality of the inorganic oxide, or with the reactive silane moiety, hereby covalently bonding the compatible anion to the support, catalysts formed therefrom, process of manufacture and the method to use.

14 Claims, No Drawings

SUPPORTED CATALYST CONTAINING TETHERED CATION FORMING ACTIVATOR

CROSS-REFERENCE TO RELATED APPLICATION

This application claims benefit of priority from provisional application 60/007,609, filed Nov. 27, 1995, now abandonded.

This invention relates to supports and supported catalysts formed therefrom that are useful for polymerization of olefins. More particularly, the invention relates to such supports comprising an activator compound that is chemically bound or tethered to the support. The invention also relates to the preparation of such support materials and supported catalysts and to their use in an olefin polymerization process.

Several supported cation forming catalysts for use in olefin polymerization processes have been previously disclosed in the art. WO-91/09882 described a supported catalyst prepared by combining i) a bis(cyclopentadienyl) metal compound containing at least one ligand capable of reacting with a proton, ii) an activator component comprising a cation capable of donating a proton and a bulky, labile anion capable of stabilizing the metal cation formed as a result of reaction between the metal compound and the activator component, and iii) a catalyst support material. The support material could be subjected to a thermal or chemical dehydration treatment. In some of the examples triethylaluminum was added for this purpose. The maximum bulk density of polymers formed by use of the foregoing supported catalyst reported in WO91/09882 was 0.17 g/cm$^3$. Catalyst efficiencies that were reported were less than satisfactory for commercial application.

WO-94/03506 described a supported ionic catalyst prepared by combining i) a monocyclopentadienyl metal compound, ii) an activator component comprising a cation which will irreversibly react with at least one ligand contained in said metal compound and an anion, said anion being a chemically stable, non-nucleophilic, anionic complex, and iii) a catalyst support material. Optionally, the supported ionic catalyst could be prepolymerized with an olefinic monomer. The support material could also be treated with a hydrolyzable organoadditive, preferably a Group 13 alkyl compound such as triethylaluminum. The reference also taught the use of such supported ionic catalysts in a gas phase polymerization process. Disadvantageously, the catalyst efficiencies obtained in WO-94/03506, were likewise insufficient for commercial use.

In U.S. Pat. No. 5,399,636, supported metallocene catalysts wherein the metallocene was chemically attached to support materials, including silica, alumina, clay, phosphated alumina, and mixtures thereof, were disclosed. In U.S. Pat. No. 5,427,991, certain catalyst supports comprising polyanionic moieties constituted of noncoordinating anionic groups chemically bonded to crosslinked polymeric core components were disclosed. At column 19, lines 4–12 the reference taught the desirability of masking or protecting hydroxyl groups on the substrate by using standard chemical treatments. However, masking or protecting the hydroxyl groups prior to the reaction with the noncoordinating anionic reactant renders them inert to further reaction, thereby defeating the purpose of the invention. Performing the masking or protecting after reaction of the noncoordinating anionic reactant detrimentally interferes with the desired chemically bonded anionic moieties. In FIG. 8, an alternative scheme comprising functionalizing surface hydroxyl groups by reaction with p-bromophenyl(trimethoxy)silane was postulated. No teaching of the desirability of limiting the quantity of surface hydroxyl functionality of the silica to amounts less than 1.0 mmol/g was provided. In addition no disclosure of forming reactive silane functionality instead of p-bromophenylsiloxane functionality is provided by the reference. For the foregoing reasons, the disclosure of this publication with respect to silica or alumina based starting materials is believed to be inoperable or deficient.

Cationic homogeneous catalysts prepared by the use of cation forming activator compounds are disclosed in numerous prior art references. In EP-A-277,004 and U.S. Pat. No. 5,064,802 the use of Bronsted acid salts able to form cations via hydrogen transfer is disclosed. In EP-A-277,003, a similar process using bulky anions containing multiple boron atoms is disclosed. In WO93/23412 carbonium salt cation forming activators are disclosed. U.S. Pat. No. 5,321,106 taught the use of oxidizing salt cationic activators and U.S. Ser. No. 304,314, filed Sep. 12, 1994 taught the use of silylium salt cationic activators. Disadvantageously, such homogeneous catalysts when supported by normal techniques of physical absorption on the surface of a support material, may be removed again by diluents found in common solution or slurry polymerizations, and by diluents potentially found in gas phase polymerization process, such as those employing condensation and recycle of either diluents or monomers. Such loss of the catalytic material from the support may detrimentally affect the bulk density of the resulting polymeric product.

It would be desirable to provide a supported catalyst and a polymerization process using the same that is capable of producing olefin polymers at good catalyst efficiencies. It would further be desirable to provide such a supported catalyst that is adapted for use in a slurry or gas phase polymerization process and is relatively unaffected by the presence of condensed monomer or diluents.

In one aspect of the present invention there is provided a support for use in preparing supported catalysts for addition polymerizations comprising the reaction product of:

(A) an inorganic oxide material comprising a solid matrix, and reactive hydroxyl groups or reactive silane functionalized derivatives of hydroxyl groups on the surface thereof, said reactive silane corresponding to the formula: —OSiR$_2$H, wherein R, independently each occurrence, is hydrogen, C$_{1-20}$ hydrocarbyl, or C$_{1-20}$ hydrocarbyloxy, said inorganic oxide material comprising less than 1.0 mmol of reactive surface hydroxyl functionality per gram, and (B) an activator compound comprising:
  b$_1$) a cation which is capable of reacting with a transition metal compound to form a catalytically active transition metal complex, and
  b$_2$) a compatible anion containing at least one substituent able to react with the inorganic oxide matrix, with residual hydroxyl functionality of the inorganic oxide, or with the reactive silane moiety, thereby covalently bonding the compatible anion to the support.

In addition there is provided a supported catalyst system useful in the addition polymerization of addition polymerizable monomers comprising the above identified support; and (C) a transition metal compound containing at least one π-bonded anionic ligand group, said transition metal compound being capable of reacting with the aforementioned support by means of the cation b$_1$) to thereby chemically bind the catalytically active transition metal complex and support.

In a further aspect, the invention provides a process for preparing a support comprising combining an inorganic oxide material comprising a solid matrix, and reactive hydroxyl groups or reactive silane functionalized derivatives of hydroxyl groups on the surface thereof, said reactive silane corresponding to the formula: —$OSiR_2H$, wherein R, independently each occurrence, is hydrogen, $C_{1-20}$ hydrocarbyl, or $C_{1-20}$ hydrocarbyloxy, said inorganic oxide material comprising less than 1.0 mmol of reactive surface hydroxyl functionality per gram, with an activator compound (B) to form a support for an olefin polymerization catalyst.

In yet another aspect the invention provides an addition polymerization process wherein one or more addition polymerizable monomers are contacted with a supported catalyst system according to the present invention under addition polymerization conditions.

The supports and supported catalysts of the invention are readily prepared in high yields and efficiencies. Importantly, catalyst systems prepared from the foregoing catalyst components demonstrate improved performance as measured by catalyst activity and/or product bulk density, compared to previously known supported catalyst systems. This is believed to be a result of controlling the quantity of available surface hydroxyl groups of the inorganic oxide to less than 1.0 mmol per gram prior to reaction with the activator compound B, and/or the use of the specific reactive silane functional groups as further disclosed herein.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Surprisingly, it has been found that using the unique combination of activator compounds and supports as specified herein, the activator compound can be attached to the support yet remain capable of activating transition metal catalysts typically employed in addition polymerization processes. The present supported catalysts can be employed to produce olefin polymers at extremely high catalyst efficiencies. Preferably the catalysts attain efficiencies of at least $1 \times 10^5$ g polymer/g transition metal, more preferably at least $1 \times 10^6$ g polymer/g transition metal. Moreover, these supported catalysts are highly immune to catalysts leaching under typical process conditions employed in gas phase or slurry polymerizations.

Additional benefits in the use of the present supported catalysts in polymerization processes include the fact that the formation of polymer deposits at reactor walls and other moving parts in the reactor is avoided and that polymers having improved bulk density are obtained in particle forming polymerization processes. According to the present invention, improved bulk densities for ethylene containing homopolymers and interpolymers are bulk densities of at least 0.20 g/cm$^3$, and preferably of at least 0.25 g/cm$^3$.

Suitable inorganic oxide supports for use in the present invention include highly porous silicas, aluminas, aluminosilicates, aluminophosphates, clays, titanias, and mixtures thereof. Preferred inorganic oxides are alumina and silica. The most preferred support material is silica. The support material may be in granular, agglomerated, pelletized, or any other physical form.

Supports suitable for the present invention preferably have a surface area as determined by nitrogen porosimetry using the B.E.T. method from 10 to 1000 m$^2$/g, and preferably from 100 to 600 m$^2$/g. The pore volume of the support, as determined by nitrogen adsorption, advantageously is between 0.1 and 3 cm$^3$/g, preferably from 0.2 to 2 cm$^3$/g. The average particle size is not critical but typically is from 0.5 to 500 μm, preferably from 1 to 150 μm.

Inorganic oxides, especially silica, alumina and aluminosilicates, are known to inherently possess small quantities of hydroxyl functionality attached to the atomic matrix. When used to prepare component A therefrom, these materials are preferably first subjected to a heat treatment and/or chemical treatment to reduce the hydroxyl content to 0.001–10 mmol/g, more preferably 0.01–1.0 mmol/g, most preferably 0.1–0.8 mmol/g. Typical heat treatments (calcining) are carried out at a temperature from 150 to 900° C., preferably 300 to 850° C. for a duration of 10 minutes to 50 hours. Typical chemical treatments include contacting with Lewis acid alkylating agents such as trihydrocarbyl aluminum compounds, trihydrocarbylchlorosilane compounds, trihydrocarbylalkoxysilane compounds or similar agents. Residual hydroxyl functionality can be detected by the technique of Fourier Transform Infrared Spectroscopy (DRIFTS IR) as disclosed in Fourier Transform Infrared Spectroscopy, P. Griffiths & J. de Haseth, 83 *Chemical Analysis*, Wiley Interscience (1986), p. 544.

The inorganic oxide may be unfunctionalized excepting for surface hydroxyl groups as previously disclosed. In this embodiment of the invention the low hydroxyl content of the support leads to superior properties of the resulting supported catalyst, most likely due to lack of interference with the transition metal complex by the residual hydroxyl groups. Preferred hydroxyl contents of such support are less than 0.8 mmol/g, preferably less than 0.5 mmol/g.

The inorganic oxide may also be functionalized by treating with a silane, hydrocarbyloxysilane, or chlorosilane functionalizing agent to attach thereto pendant reactive silane functionality, as previously disclosed. Suitable functionalizing agents are compounds that react with the surface hydroxyl groups of the inorganic oxide or react with the metal or metalloid atoms of the inorganic oxide matrix. Examples of suitable functionalizing agents include phenylsilane, diphenylsilane, methylphenylsilane, dimethylsilane, diethylsilane, diethoxysilane, and chlorodimethylsilane. Techniques for forming such functionalized inorganic oxide compounds were previously disclosed in U.S. Pat. Nos. 3,687,920 and 3,879,368.

In a preferred embodiment the silane and the inorganic oxide are contacted, optionally in the presence of a hydrocarbon diluent, in the presence of a base assist, preferably a $C_{1-4}$ trialkylamine. The reaction is conducted at a temperature from 0 to 110° C., preferably from 20 to 50° C. Generally an excess of functionalizing agent is employed. Preferred ratios of functionalizing agent based on inorganic oxide are from 1 to 2500 mmol/g. As a result of the foregoing functionalizing reaction, residual hydroxyl functionality of the inorganic oxide is further reduced to the previously mentioned low level of less than 1.0 mmol/g. Preferably, the residual hydroxyl content of functionalized supports is less than 0.8 mmol/g, and most preferably less than 0.5 mmol/g. Highly preferably in preparing component A, a calcined silica is employed having initial (i. e. prefunctionalized) residual hydroxyl content less than 1.0 mmol/g, and from 1 to 20 mmol of functionalizing agent/g silica is employed. The molar ratio of base assist employed to functionalizing agent is generally from 0.7:1 to 2.0:1. Unreacted functionalizing agent is preferably removed from the surface of the inorganic oxide, for example, by washing with a liquid hydrocarbon, and the support is thoroughly dried prior to use in preparing supported catalyst systems.

The inorganic oxide, the resulting support, or the supported catalyst system may also be treated with an aluminum component selected from an alumoxane or an aluminum compound of the formula $AlR_3$, wherein R is as previously defined. Examples of suitable R groups include methyl, methoxy, ethyl, ethoxy, propyl (all isomers), propoxy (all isomers), butyl (all isomers), butoxy (all isomers), phenyl, and benzyl. Preferably, the aluminum component is selected from the group consisting of aluminoxanes and tri($C_{1-4}$ hydrocarbyl)aluminum compounds. Most preferred aluminum components are aluminoxanes, trimethyl aluminum, triethyl aluminum, triisobutyl aluminum, and mixtures thereof.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane is believed to be represented by the following general formulae $(—Al(R)—O)_m$, for a cyclic alumoxane, and $R_2Al—O(—Al(R)—O)_m—AlR_2$, for a linear compound, wherein R is as previously defined, and m is an integer ranging from 1 to 50, preferably at least 4. Alumoxanes are typically the reaction products of water and an aluminum alkyl, which in addition to an alkyl group may contain halide or alkoxide groups. Reacting several different aluminum alkyl compounds, such as for example trimethyl aluminum and tri-isobutyl aluminum, with water yields so-called modified or mixed alumoxanes. Preferred alumoxanes are methylalumoxane and methylalumoxane modified with minor amounts of $C_{2-4}$ alkyl groups, especially isobutyl. Alumoxanes generally contain minor to substantial amounts of starting aluminum alkyl compound.

Particular techniques for the preparation of alumoxane type compounds by contacting an aluminum alkyl compound with an inorganic salt containing water of crystallization are disclosed in U.S. Pat. No. 4,542,119. In a particular preferred embodiment an aluminum alkyl compound is contacted with a regeneratable water-containing substance such as hydrated alumina, silica or other substance. This is disclosed in EP-A-338,044. Thus the alumoxane may be incorporated into the support by reaction of a hydrated alumina or silica material, which has optionally been functionalized with silane, siloxane, hydrocarbyloxysilane, or chlorosilane groups, with a tri($C_{1-10}$ alkyl) aluminum compound according to known techniques.

A treatment of the inorganic oxide material in order to also include optional alumoxane or trialkylaluminum loadings in addition to activator compound involves contacting the same before, after or simultaneously with addition of the activator compound hereunder with an alumoxane or trialkylaluminum compound, especially triethylaluminum or triisobutylaluminum. Optionally the mixture can also be heated under an inert atmosphere for a period and at a temperature sufficient to fix alumoxane or trialkylaluminum to the support, or the support component containing alumoxane or the trialkylaluminum compound may be subjected to one or more wash steps to remove alumoxane or trialkylaluminum not fixed to the support.

Besides contacting the support with alumoxane the alumoxane may be generated in situ by contacting an unhydrolyzed inorganic oxide or a moistened inorganic oxide with a trialkyl aluminum compound optionally in the presence of an inert diluent. Such a process is well known in the art, having been disclosed in EP-A-250,600, U.S. Pat. Nos. 4,912,075, and 5,008,228. Suitable aliphatic hydrocarbon diluents include pentane, isopentane, hexane, heptane, octane, isooctane, nonane, isononane, decane, cyclohexane, methylcyclohexane and combinations of two or more of such diluents. Suitable aromatic hydrocarbon diluents are benzene, toluene, xylene, and other alkyl or halogen substituted aromatic compounds. Most preferably, the diluent is an aromatic hydrocarbon, especially toluene. After preparation in the foregoing manner the residual hydroxyl content thereof is reduced to the desired low level less than 1.0 mmol of OH per gram of support, by any of the previously disclosed techniques.

The anionic component of the activator compound B used according to the present invention corresponds to the formula:

$$[DM'Q_3]^-$$

wherein:

D is a linking group comprising functionality capable of reaction with the inorganic oxide matrix, with residual hydroxyl functionality thereof, or with reactive silane functional groups of the optionally functionalized inorganic oxide, M' is boron or aluminum in an oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms.

Most preferably, Q is each occurrence a fluorinated aryl group, especially, a pentafluorophenyl group.

Preferred activator compounds are salts of the formula $$G^{+e}[DM'Q_3]^-_e,$$

wherein $G^{+e}$ is the cationic remnant of a Bronsted acid salt, an oxidizing cation, a carbonium ion or a silylium ion; and e is an integer from 1 to 3, most preferably 1.

Suitable linking substituents, D, on compatible anions used with unmodified inorganic oxides or with inorganic oxide containing only residual hydroxyl functionality, include moieties bearing silane, siloxane, hydrocarbyloxysilane, halosilane, amino, carboxylic acid, carboxylic acid ester, aldehyde, ketone or epoxide functionality, containing from 1 to $1 \times 10^6$ nonhydrogen atoms, more preferably from 2 to 1000 nonhydrogen atoms, and most preferably 4 to 20 nonhydrogen atoms. In practice, use of silane containing compatible anions may require use of a base catalyst, such as a tri($C_{1-4}$ alkyl)amine, to effect the reaction with a substrate containing only residual hydroxyl functionality. Preferably D for use with such unmodified inorganic oxide compounds is a silane or chlorosilane substituted hydrocarbyl radical. Preferred linking substituents, D, include silyl-substituted aryl, silyl-substituted aralkyl, silyl-substituted alkaryl, silyl-substituted alkyl, silyl-substituted haloaryl, or silyl-substituted haloalkyl groups, including polymeric linking groups, most preferably p-silylphenyl ($—C_6H_4SiH_3$), p-silyltetrafluorophenyl ($—C_6F_4SiH_3$), silylnaphthyl ($—C_{10}H_8SiH_3$), silylperfluoronaphthyl ($—C_{10}F_8SiH_3$), and 2-silyl-1-ethyl($—C_2H_4SiH_3$), groups.

Suitable linking substituents, D, on compatible anions used with inorganic oxides that have been modified with reactive silane functionality include moieties bearing silane, siloxane, hydrocarbyloxysilane, halosilane, hydroxyl, thiol, amino, carboxylic acid, carboxylic acid ester, aldehyde, ketone or epoxide functionality containing from 1 to $1 \times 10^6$ nonhydrogen atoms, more preferably from 2 to 1000 nonhydrogen atoms, and most preferably 4 to 20 nonhydrogen atoms. Preferably D, in such circumstances is a hydroxyl substituted hydrocarbyl radical, more preferably a hydroxy-substituted aryl, hydroxy-substituted aralkyl, hydroxy-substituted alkaryl, hydroxy-substituted alkyl, hydroxy-substituted haloaryl, or hydroxy-substituted haloalkyl group including polymeric linking groups, most preferably hydroxyphenyl, hydroxytolyl, hydroxybenzyl, hydroxynaphthyl, hydroxybisphenyl, hydroxycyclohexyl, $C_{1-4}$ hydroxyalkyl, and hydroxy-polystyryl groups, or fluorinated derivatives thereof. A most preferred linking substituent, D, is a p-hydroxyphenyl, 4-hydroxybenzyl, 6-hydroxy-2-naphthyl group, 4-(4'-hydroxyphenyl)phenyl, 4-((4'-hydroxyphenyl)dimethylmethylene)phenyl, or fluorinated derivatives thereof. A base catalyst, such as a tri($C_{1-4}$ alkyl)amine, may also be used to assist in the reaction with the substrate.

Most highly preferably, D is one of the foregoing hydroxy substituted substituents used in combination with a reactive silane functionalized silica.

Illustrative, but not limiting, examples of anionic components, $[DM'Q_3]^-$, of activator compounds to be used in the present invention include tris(pentafluorophenyl)(4-hydroxyphenyl)borate, tris(pentafluorophenyl)(4-hydroxytetrafluorophenyl)borate, tris-(2,4-difluorophenyl)(4-hydroxyphenyl)borate, tris-(3,5-difluorophenyl)(4-hydroxyphenyl)borate, tris-(3,5-di-trifluoromethylphenyl)(4-hydroxyphenyl)borate, tris(pentafluorophenyl)(2-hydroxyethyl)borate, tris(pentafluorophenyl)(4-hydroxybutyl)borate, tris(pentafluoro-phenyl)(4-hydroxycyclohexyl)borate, tris(pentafluorophenyl)(3,5-dimethyl-4-hydroxyphenyl)borate, tris(pentafluorophenyl) 4-(4'-hydroxyphenyl)phenylborate, and tris(pentafluorophenyl)hydroxynaphthylborate (all isomers, especially tris(pentafluorophenyl) (6-hydroxy-2-naphthyl) borate.

The cationic portion of the activator compound can be any cation which is capable of reacting with the transition metal compound to form a catalytically active transition metal complex. Preferably the cation is selected from the group consisting of Bronsted acid cations, carbonium cations, silylium cations, and cationic oxidizing agents.

Bronsted acidic cations may be represented by the following general formula:

(L*—H)$^+$ wherein:
L* is a neutral Lewis base, preferably a nitrogen, phosphorus, oxygen, or sulfur containing Lewis base; and (L*—H)$^+$ is a Bronsted acid.

Illustrative, but not limiting, examples of Bronsted acidic cations of activator compounds to be used in the present invention are trialkyl-substituted ammonium cations such as triethylammonium, tripropylammonium, tri(n-butyl) ammonium, trimethylammonium, tributylammonium. Also suitable are N,N-dialkyl anilinium cations such as N,N-dimethylanilinium, N,N-diethylanilinium, N,N-2,4,6-pentamethylanilinium and the like; dialkyl ammonium cations such as di-(i-propyl)ammonium, dicyclohexylammonium and the like; and triaryl phosphonium cations such as triphenylphosphonium, tri(methylphenyl)phosphonium, tri(dimethylphenyl) phosphonium, diethyloxonium, dimethylsulphonium, diethylsulphonium, and diphenylsulphonium.

A second type of suitable cation (depicted as $^+$) is a stable carbonium or silylium ion containing up to 30 non-hydrogen atoms, the cation being capable of reacting with a substituent of the transition metal compound and converting it into a catalytically active transition metal complex. Suitable examples of carbonium cations include tropyllium, triphenylmethylium, and benzene(diazonium) cations. Silylium salts have been previously generically disclosed in *J. Chem Soc. Chem. Comm.*, 1993, 383–384, as well as Lambert, J. B., et al., *Organometallics*, 1994, 13, 2430–2443. Preferred silylium cations are trimethylsilylium, triethylsilylium and ether substituted adducts thereof.

Another suitable type of cation (depicted as $Ox^{e+}$) is a cationic oxidizing agent having a charge of e+, and e is an integer from 1 to 3.

Examples of cationic oxidizing agents include: ferrocenium, hydrocarbyl-substituted ferrocenium, $Ag^+$, and $Pb^{2+}$.

The activator compounds to be used in the present invention are readily prepared by combining a Group 1, Group 2 or Grignard metal derivative of the functionalizing substituent, D, or a masked derivative thereof with a neutral precursor to the anion and thereafter contacting this reaction product with the chloride salt of the cation to be utilized. Examples of suitable metal derivatives include lithium or Grignard salts. The term "masked derivative" refers to the well known practice of utilizing an inert functionality during the preparation and converting the same to the desired, reactive functionality in a subsequent step by methods which are well known by those skilled in the art. For example, a trimethylsiloxy group may be present during the synthesis and subsequently converted to the desired hydroxyl group by hydrolysis.

The support of the present invention generally comprises from 0.001 to 10 mmol of activator compound per gram of inorganic oxide, preferably from 0.01 to 1 mmol/g. At too high amounts of activator compound, the support becomes expensive. At too low amounts the catalyst efficiency of the resulting supported catalyst becomes unacceptable. Residual hydroxyl content after reaction with the activator compound is desirably less than 50 mole percent based on desired transition metal complex loading, more preferably less than 10 mole percent based on desired transition metal complex loading, most preferably less than 1 mole percent based on desired transition metal complex loading.

The support of the present invention can be stored or shipped under inert conditions as such or slurried in an inert diluent, such as alkane or aromatic hydrocarbons. It may be used to generate the supported catalyst of the present invention by contacting with a suitable transition metal compound optionally in the presence of a liquid diluent.

Suitable transition metal compounds (C) for use in the supported catalyst of the present invention may be derivatives of any transition metal including Lanthanides, but preferably of Group 3, 4, or Lanthanide metals which are in the +2, +3, or +4 formal oxidation state meeting the previously mentioned requirements. Preferred compounds include metal complexes containing from 1 to 3π-bonded anionic ligand groups, which may be cyclic or noncyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of a π bond.

Each atom in the delocalized π-bonded group may independently be substituted with a radical selected from the group consisting of halogen, hydrocarbyl, halohydrocarbyl, and hydrocarbyl-substituted metalloid radicals wherein the metalloid is selected from Group 14 of the Periodic Table of the Elements. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system or a hydrogenated fused ring system. Suitable hydrocarbyl-substituted organometalloid radicals include mono-, di- and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted derivatives thereof. Preferred anionic delocalized π-bonded groups are cyclopentadienyl, pentamethylcyclopentadienyl, tetramethylcyclopentadienyl, indenyl, 2,3-dimethylindenyl, fluorenyl, 2-methylindenyl and 2-methyl-4-phenylindenyl.

Suitable transition metal compounds C) may be any derivative of any transition metal including Lanthanides, but preferably of the Group 3, 4, or Lanthanide transition metals. More preferred are metal complexes corresponding to the formula:

$L_lMX_mX'_nX''_p$, or a dimer thereof wherein:

L is an anionic, delocalized, π-bonded group that is bound to M, containing up to 50 nonhydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M.

Preferred complexes include those containing either one or two L groups. The latter complexes include those containing a bridging group linking the two L groups. Preferred bridging groups are those corresponding to the formula $(ER*_2)_x$ wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Examples of the foregoing bis(L) containing complexes are compounds corresponding to the formula:

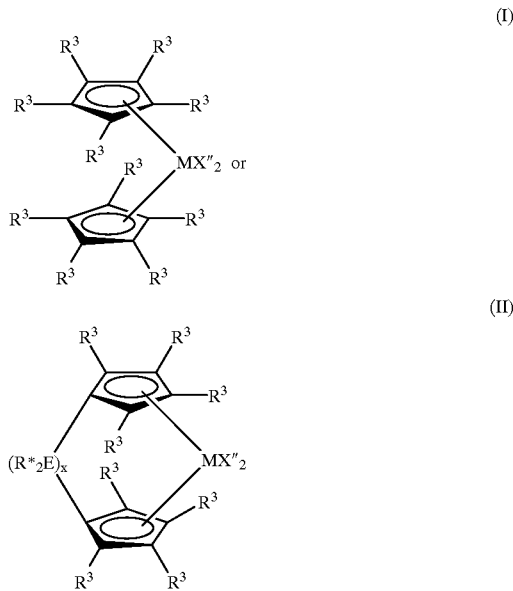

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 non-hydrogen atoms forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possess Cs symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem,* 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bistetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred X" groups are selected from hydride, hydrocarbyl, silyl, germyl, halohydrocarbyl, halosilyl, silyl-hydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention correspond to the formula:

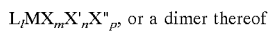

wherein:

L is an anionic, delocalized, π-bonded group that is bound to M, containing up to 50 nonhydrogen atoms;

M is a metal of Group 4 of the Periodic Table of the Elements in the +2, +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, optionally two X" groups together may form a divalent anionic moiety having both valences bound to M or a neutral $C_{5-30}$ conjugated diene, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

Preferred divalent X substituents preferably include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention correspond to the formula:

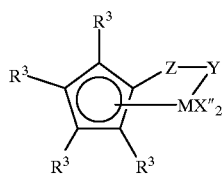

wherein:

M is titanium or zirconium in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a halo, hydrocarbyl, hydrocarbyloxy or silyl group, said group having up to 20 nonhydrogen atoms, or two X" groups together form a $C_{5-30}$ conjugated diene;

Y is —O—, —S—, —NR*—, —PR*—; and

Z is $SiR*_2$, $CR*_2$, $SiR*_2SiR*_2$, $CR*_2CR*_2$, $CR*=CR*$, $CR*_2SiR*_2$, or $GeR*_2$, wherein: R* is as previously defined.

Illustrative Group 4 metal complexes that may be employed in the practice of the present invention include:

cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-$\eta$-1,4,5,6,7,8-hexahydronaphthalenyl)titaniumtrimethyl,
(1,1,2,3-tetramethyl-2,3,4,9,10-$\eta$-1,4,5,6,7,8-hexahydronaphthalenyl)titaniumtrimethyl,
(tert-butylamido)(tetramethyl-$\eta^5$-cyclopentadienyl) dimethylsilanetitanium dichloride,
(tert-butylamido)(tetramethyl-$\eta^5$-cyclopentadienyl) dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl) dimethylsilanetitanium dimethyl,
(tert-butylamido)(tetramethyl-$\eta^5$-cyclopentadienyl) dimethylsilane titanium (III) 2-(dimethylamino)benzyl;
(tert-butylamido)(tetramethyl-$\eta^5$-cyclopentadienyl) dimethylsilanetitanium (III) allyl,
(tert-butylamido)(tetramethyl-$\eta^5$-cyclopentadienyl) dimethyl-silanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl) dimethylsilanetitanium (II) 1,4-diphenyl-1,3-butadiene,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene, (tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl) dimethylsilanetitanium (II) 1,4-diphenyl-1,3-butadiene,
(tert-butylamido)(tetramethyl-$\eta^5$-cyclopentadienyl) dimethyl-silanetitanium (IV) 1,3-butadiene,
(tert-butylamido)(tetramethyl-$\eta^5$-cyclopentadienyl) dimethyl-silanetitanium (II) 1,4-dibenzyl-1,3-butadiene,
(tert-butylamido)(tetramethyl-$\eta^5$-cyclopentadienyl) dimethyl-silanetitanium (II) 2,4-hexadiene,
(tert-butylamido)(tetramethyl-$\eta^5$-cyclopentadienyl) dimethyl-silanetitanium (II) 3-methyl-1,3-pentadiene,
(tert-butylamido)(2,4-dimethyl-1,3-pentadien-2-yl) dimethyl-silanetitaniumdimethyl,
(tert-butylamido)(1,1-dimethyl-2,3,4,9,10-$\eta$-1,4,5,6,7,8-hexahydronaphthalen-4-yl) dimethylsilanetitaniumdimethyl, and
(tert-butylamido)(1,1,2,3-tetramethyl-2,3,4,9,10-$\eta$-1,4,5,6,7,8-hexahydronaphthalen-4-yl) dimethylsilanetitaniumdimethyl.

Bis(L) containing complexes including bridged complexes suitable for use in the present invention include:

biscyclopentadienylzirconiumdimethyl,
biscyclopentadienyltitaniumdiethyl,
biscyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitaniummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitanium methyltrimethylsilyl,
bistetrahydroindenyltitanium methyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2,4-pentadienyl,
(dimethylsilyl-bis-t-butylcyclopentadienyl) zirconiumdichloride,
(methylene-bis-pentamethylcyclopentadienyl)titanium(III) 2-(dimethylamino)benzyl,
(dimethylsilyl-bis-indenyl)zirconiumdichloride,
(dimethylsilyl-bis-2-methylindenyl)zirconiumdimethyl,
(dimethylsilyl-bis-2-methyl-4-phenylindenyl) zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene,
(dimethylsilyl-bis-fluorenyl)zirconiumdichloride,
(dimethylsilyl-bis-tetrahydrofluorenyl)zirconiumdi (trimethylsilyl),
(isopropylidene)(cyclopentadienyl)(fluorenyl) zirconiumdibenzyl, and
(dimethylsilylpentamethylcyclopentadienylfluorenyl) zirconiumdimethyl.

Other compounds which are useful in the preparation of catalyst compositions according to this invention, especially compounds containing other Group 4 metals, will, of course, be apparent to those skilled in the art.

Generally, the ratio of moles of activator compound (B) to moles of transition metal compound (C) in the supported catalyst is from 0.5:1 to 2:1, preferably from 0.5:1 to 1.5:1 and most preferably from 0.75:1 to 1.25:1. At too low ratios the supported catalyst will not be very active, whereas at too high ratios the catalyst cost becomes excessive due to the relatively large quantities of activator compound utilized. The quantity of transition metal complex chemically bound to the inorganic oxide matrix in the resulting supported catalyst is preferably from 0.0005 to 20 mmol/g, more preferably from 0.001 to 10 mmol/g.

The supported catalyst of the present invention can be prepared by combining the support material, the activator compound and the metal complex in any order. Preferably, the inorganic oxide material is first treated with the activator compound by combining the two components in a suitable liquid diluent, such as an aliphatic or aromatic hydrocarbon to form a slurry. The temperature, pressure, and contact time for this treatment are not critical, but generally vary from –20° C. to 150° C., from 1 Pa to 10,000 MPa, more preferably at atmospheric pressure (100 kPa), for 5 minutes to 48 hours. Usually the slurry is agitated. After this treatment the solids are typically separated from the diluent.

Before using the support of the invention, the diluent or solvent is preferably removed to obtain a free flowing powder. This is preferably done by applying a technique which only removes the liquid and leaves the resulting solid, such as by applying heat, reduced pressure, evaporation, or a combination thereof. Alternatively, the support may be further contacted with the transition metal compound (C) prior to removing the liquid diluent. If so contacted the transition metal compound is preferably used dissolved in a suitable solvent, such as a liquid hydrocarbon solvent, advantageously a $C_{5-10}$ aliphatic or cycloaliphatic hydrocarbon or a $C_{6-10}$ aromatic hydrocarbon. Alternatively, a suspension or dispersion of the transition metal compound in a nonsolvent may also be used. The contact temperature is not critical provided it is below the decomposition temperature of the transition metal and of the activator. Good results are obtained in a temperature range of 0 to 100° C. The contact may be total immersion in the liquid medium or contact with an atomized spray of the solution, dispersion or suspension. All steps in the present process should be conducted in the absence of oxygen and moisture. The resulting supported catalyst may be stored or shipped in free flowing form under inert conditions after removal of the solvent.

The supported catalysts of the present invention may be used in addition polymerization processes wherein one or more addition polymerizable monomers are contacted with the supported catalyst of the invention under addition polymerization conditions.

Suitable addition polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

The supported catalyst can be formed in situ in the polymerization mixture by introducing into said mixture both a support of the present invention, or its components, as well as a suitable transition metal compound (C). The supported catalyst can be advantageously employed in a high pressure, solution, slurry or gas phase polymerization process. A high pressure process is usually carried out at temperatures from 100 to 400° C. and at pressures above 500 bar. A slurry process typically uses an inert hydrocarbon diluent and temperatures of from 0° C. up to a temperature just below the temperature at which the resulting polymer becomes substantially soluble in the inert polymerization medium. Preferred temperatures are from 40° C. to 115° C. The solution process is carried out at temperatures from the temperature at which the resulting polymer is soluble in an inert solvent up to 275° C., preferably at temperatures of from 130° C. to 260° C., more preferably from 150° C. to 240° C. Preferred inert solvents are $C_{1-20}$ hydrocarbons and preferably $C_{5-10}$ aliphatic hydrocarbons, including mixtures thereof. The solution and slurry processes are usually carried out at pressures between 100 kPa to 10 MPa. Typical operating conditions for gas phase polymerizations are from 20 to 100° C., more preferably from 40 to 80° C. In gas phase processes the pressure is typically from 10 kPa to 10 MPa. Condensed monomer or diluent may be injected into the reactor to assist in heat removal by means of latent heat of vaporization.

Preferably for use in gas phase polymerization processes, the support has a median particle diameter from 20 to 200 μm, more preferably from 30 μm to 150 μm, and most preferably from 50 μm to 100 μm. Preferably for use in slurry polymerization processes, the support has a median particle diameter from 1 to 200 μm, more preferably from 5 μm to 100 μm, and most preferably from 20 μm to 80 μm. Preferably for use in solution or high pressure polymerization processes, the support has a median particle diameter from 1 to 40 μm, more preferably from 1 μm to 30 μm, and most preferably from 1 μm to 20 μm.

In the polymerization process of the present invention, scavengers may be used which serve to protect the supported catalyst from catalyst poisons such as water, oxygen, and polar compounds. These scavengers are generally used in varying amounts depending on the amounts of impurities. Preferred scavengers include the aforementioned organoaluminum compounds of the formula $AlR_3$ or alumoxanes.

In the present polymerization process, molecular weight control agents can also be used. Examples of such molecular weight control agents include hydrogen, trialkyl aluminum compounds or other known chain transfer agents. A particular benefit of the use of the present supported catalysts is the ability (depending on reaction conditions) to produce narrow molecular weight distribution α-olefin homopolymers and copolymers. Preferred polymers have Mw/Mn of less than 2.5, more preferably less than 2.3. Such narrow molecular weight distribution polymer products, especially those from a slurry process are highly desirable due to improved tensile strength properties.

Having described the invention the following examples are provided as further illustration thereof and are not to be construed as limiting. Unless stated to the contrary all parts and percentages are expressed on a weight basis. The bulk density of the polymers produced was determined according to ASTM 1895.

EXAMPLES

Example 1

A1a. Synthesis of (4-bromophenoxy)trimethylsilane
$BrC_6H_4$-p-$OSiMe_3$ 1,1,1,3,3,3-hexamethyldisilazane (100 ml; 98 percent purity; 0.464 mol) was added to $BrC_6H_4$-p-OH (40.3 g; 0.116 mol) and heated to reflux for 2 hours. After cooling to 25° C., the excess 1,1,1,3,3,3-hexamethyldisilazane was separated by distillation (120° C.) and the residue purified by flash chromatography using silica (Davison 948, 800° C., pentane). The product was a colorless liquid. Yield: 50 g (88 percent)

A1b. Synthesis of $MgBrC_6H_4$-p-$OSiMe_3$

Magnesium turnings (1.20 g; 49.4 mmol) were mixed with THF (4 ml) followed by 1,2-dibromoethane (0.25 ml; 2.87 mmol) in a 100 ml 3-necked flask. The mixture began to reflux, and a solution of 4-bromophenoxytrimethylsilane (7.5 ml; 38.8 mmol) in THF (32 ml) was added dropwise through a syringe over a period of 15 minutes. The resulting reaction mixture was further refluxed for 1 hour and then cooled to 25° C. The dark gray solution was filtered and titrated with 2-butanol in the presence of 5-methyl-1,10-phenanthroline. Yield: 81 percent (0.87 M, 36 ml).

A1c. Synthesis of [MgBr.2THF][$(C_6F_5)_3B(C_6H_4$-p-$OSiMe_3)$]

A solution of $B(C_6F_5)_3$ (15.85 g; 31 mmol) in 100 ml diethyl ether was treated with freshly prepared $MgBrC_6H_4$-p-$OSiMe_3$ (35.5 ml; 0.87 M in THF) at room temperature. The reaction mixture was stirred for 16 hours, 100 ml pentane was added and the mixture further stirred for 30 minutes to form a two layer mixture. The upper pentane layer was decanted and the lower layer was further washed with pentane (50 ml) two times. The resulting syrup was evaporated under reduced pressure to obtain the white solid product. Yield: 22.1 g (77 percent) $^1$H NMR ($d^8$-THF) δ+0.18 (s, 9H, —$SiMe_3$), 6.45 (d, 2H, $C_6H_4$), 7.06 (d, 2H, $C_6H_4$). $^{19}$F ($d^8$-THF) δ−131.1 (d), −167.2 (t), −169.9 (t). $^{13}$C ($d^8$-THF) δ+0.46 (s, —$SiMe_3$), 117–153 ($C_{aryl}$)

A1d. Synthesis of dimethylanilinium (4-hydroxyphenyl)tris(penta-fluorophenyl)borate [$PhMe_2NH$][$(C_6F_5)_3B(C_6H_4$-p-OH)]

[MgBr2THF][$(C_6F_5)_3B(C_6H_4$-p-$OSiMe_3)$] (22.1 g; 23.9 mmol) and aqueous $NMe_2PhHCl$ solution (100 ml; 0.312 M; 31.2 mmol) were stirred at room temperature for 16 hours. The resulting $H_2O$ solution was carefully decanted and the viscous solid was washed with distilled $H_2O$ (6×150 ml) and rinsed with pentane (3×100 ml) and dried under reduced pressure. Yield: 13.2 g (76 percent). $^1$H NMR ($d^8$-THF) δ+3.22 (s, 6H, —$NHMe_2Ph$), 6.40 (d, 2H, $C_6H_4$), 7.05 (d, 2H, $C_6H_4$), 7.4–7.7 (m, 5H, $NHMe_2Ph$). $^{19}$F ($d^8$-THF) δ−131.1 (d), −167.8(t), −169.9(t). $^{13}$C ($d^8$-THF) δ+46.3 ($NHMe_2Ph$), 112–158 ($C_{aryl}$).

A2a. Synthesis of 4-((4'-bromophenyl)phenoxy) trimethylsilane BrC$_6$H$_4$—C$_6$H$_4$-p-OSiMe$_3$ 1,1,1,3,3,3-Hexamethyldisilazane (75 ml; 98 percent purity; 0.348 mol) was added to BrC$_6$H$_4$—C$_6$H$_4$-p-OH (30 g; 0.117 mol) and heated to reflux for 4 hours. After cooling to 25° C., the solid product was filtered and rinsed with cold pentane (50 ml; 0° C.). The crude product was then dissolved in diethylether and purified by flash chromatography of silica (Davison 948, 800° C., pentane). The product was a white crystalline solid. Yield: 33.6 g (89 percent)

A2b. Synthesis of MgBrC$_6$H$_4$—C$_6$H$_4$-p-OSiMe$_3$

Magnesium powder (50 mesh; 0.47 g; 19.3 mmol) was mixed with THF (5 ml) in a 3-necked flask. 1,2-dibromoethane (0.25 ml; 2.87 mmol) was then syringed into the flask and heated to reflux vigorously. A THF solution (11 ml) of BrC$_6$H$_4$—C$_6$H$_4$-p-OSiMe$_3$ (3.0 g; 9.34 mmol) was added dropwise through a syringe over a period of 20 minutes under reflux conditions. The resulting hot reaction mixture was cooled to 25° C. in 1.5 hours. The dark gray solution was filtered and titrated with 2-butanol in the presence of 5-methyl-1,10-phenanthroline. Yield: 87 percent (0.76 M, 10.9 ml).

A2c. Synthesis of [MgBr.2THF][(C$_6$F$_5$)$_3$B(C$_6$H$_4$—C$_6$H$_4$-p-OSiMe$_3$)]

A solution of B(C$_6$F$_5$)$_3$ (3.24 g; 6.33 mmol) in 50 ml diethyl ether was treated with freshly prepared MgBrC$_6$H$_4$—C$_6$H$_4$-p-OSiMe$_3$ (10.4 ml; 0.76 M; 8.13 mmol) at room temperature. The resulting mixture was stirred for 3 hours, worked up, and recovered following the procedure of Example 3A1c). Yield: 6.84 g (84 percent)

A2d. Synthesis of dimethylanilinium 4-((4'-hydroxyphenyl)phenyl)-tris(pentafluorophenyl) borate[PhMe$_2$NH]$^+$[(C$_6$F$_5$)$_3$B(C$_6$H$_4$—C$_6$H$_4$-p-OH)]$^-$ The procedure of 1A1d) is substantially repeated. Yield: 84 percent

A3a. Preparation of 2-bromo-6-trimethylsiloxynaphthalene

A slurry of 10.0 g 2-bromo-6-naphthol in 30 mL Me$_3$SiNHSiMe$_3$ was stirred under argon for 2 hours. At this time, the excess silane reagent was removed under reduced pressure. The remaining solids were dissolved in 20 mL pentane and eluted down a 2 inch (5 cm) pad of silica. The solvent was removed under reduced pressure yielding 11.5 g of 2-bromo-6-trimethylsiloxynaphthalene as a white, crystalline solid. $^1$H NMR (CDCl$_3$): –0.40 (s, 9 H, SiMe$_3$), 6.4–7.3 (m, 6 H, aromatic H) ppm.

A3b. Preparation of 6-(trimethylsiloxy-2-naphthyl) tris(pentafluoro-phenyl)borate MgBr$_2$.(Et$_2$O)$_x$ (MgBr$_2$(Et$_2$O)$_x$[6-Me$_3$SiOC$_{10}$H$_6$-2-B(C$_6$F$_5$)$_3$])

A slurry of 0.7 g Mg powder in 10 mL THF was activated by addition of 0.1 mL BrCH$_2$CH$_2$Br and heated to a gentle reflux. A solution of 5.0 g 2-bromo-6-trimethylsiloxynaphthalene in 5 mL THF was added over a 30 minute period. At this time a 0.5 mL aliquot of the cooled solution was titrated with isopropyl alcohol. The remaining 13.9 mL of 0.758 M Grignard solution was added to a slurry of 5.39 g [B(C$_6$F$_5$)$_3$] in 30 mL Et$_2$O. The mixture was stirred for 20 hours, during which time a white precipitate formed. The solids were collected by filtration, washed with Et$_2$O and pentane, and dried under reduced pressure. Yield: 6.81 g MgBr$_2$(Et$_2$O)x[6-Me$_3$SiOC$_{10}$H$_6$-2-B(C$_6$F$_5$)$_3$]. $^1$H NMR (THF-d$_8$): 0.28 (s, 9 H, SiMe3), 6.8–7.7 (m, 6 H, aromatic H) ppm. $^{19}$F{$^1$H} NMR (THF-d8): –123.0 (d, J$_{F-F}$=19,5 Hz, ortho F), –159.4 (m, meta F), –161.9 (t, J$_{F-F}$=23 Hz, para F).

A3c. Preparation of dimethylanilinium (6-hydroxy-2-naphthyl)tris(penta-fluorophenyl)borate PhMe$_2$NH$^+$[6-HOC$_{10}$H$_6$-2-B(C$_6$F$_5$)$_3$]$^-$ The 6.81 g MgBr$_2$(Et$_2$O)x[6-Me$_3$SiOC$_{10}$H$_6$-2-B(C$_6$F$_5$)$_3$] prepared above were slurried in distilled water with an excess of PhMe$_2$NHCl for 4 hours. The water solution was decanted and the solids washed with several portions of distilled water. The resulting solids were dissolved in 10 mL methanol. The methanol was subsequently removed under reduced pressure to yield PhMe$_2$NH[6-HOC$_{10}$H$_6$-2-B(C$_6$F$_5$)$_3$] as a white, crystalline solid. Yield: 4.34 g. $^1$H NMR (THF-d$_8$): 3.02 (6 H, NMe$_2$), 6.6–7.5 (11 H, aromatic H) ppm. $^{19}$F{1H} NMR (THF-d$_8$): –123.1 (d, J$_{F-F}$=20.6 Hz, ortho F), –159.4 (m, meta F), –161.8 (t, J$_{F-F}$=23 Hz, para F).

B. Preparation of phenylsilane modified silica (PhH$_2$Si—O-Silica)

A pentane (150 ml) slurry of 10 g of Davison™ 948 (800° C.) silica (available from Davison division of Grace Chemical Co.) was treated with phenylsilane (PhSiH$_3$) (2.70 g; 0.025 mol) and triethylamine (NEt$_3$) (2.53 g; 0.025 mol) via a syringe under argon atmosphere at 23° C. Hydrogen gas evolved from the solution vigorously. The resulting mixture was agitated for 12 h. The phenylsilane-modified silica was collected on a frit under argon, washed with pentane (5×5 ml), and dried under reduced pressure. Yield was 10.43 g. DRIFTS IR: n (Si—H) 2178 cm$^{-1}$ (vs). $^{29}$Si CPMAS: δ–23 ppm. Hydroxyl content of the functionalized silica was undetectable (<0.1 mmol./g)

C. Preparation of the supported anilinium borate ([NHMe$_2$Ph]$^+$[(C$_6$F$_5$)$_3$B (C$_6$H$_4$-p-O—SiHPh—O-Silica)]$^-$ An ether (30 ml) slurry of phenylsilane-modified silica (3.00 g) was treated with 100 ml of an ether solution of [NHMe$_2$Ph]$^+$[(C$_6$F$_5$)$_3$B(C$_6$H$_4$-p-OH)]$^-$ (1.05 g; 1.44 mmol) at room temperature under an argon atmosphere. Hydrogen gas evolved from the solution for 10 min. The solution was stirred for 15 h and the resulting white solid was filtered, washed with ether (5×20 ml) and pentane (3×20 ml), and dried under reduced pressure. Yield was 3.71 g. DRIFTS IR: n (Si—H) 2190 cm$^{-1}$ (m); n (N—H) 3239 cm$^{-1}$ (s). $^{29}$Si CPMAS: —O—SiHPh-OSilica (s, –41 ppm). $^{13}$C CPMAS: NHMe$_2$Ph (s, 48.5 ppm).

D. Slurry Batch Reactor Polymerization

A 2 liter autoclave reactor was evacuated at 80° C. overnight prior to use. A heptane (300 ml) slurry of phenylsilane functionalized-silica-supported anilinium (4-hydroxyphenyl)tris(pentafluorophenyl) borate, ([NHMe$_2$Ph]$^+$[(C$_6$F$_5$)$_3$B (C$_6$H$_4$-p-O—SiHPh-OSilica)]$^-$) (200 mg), was treated with (t-butylamido)dimethyl (tetramethyl-η$^5$-cyclopentadienyl)-silanetitanium dimethyl (10 mg; 31 mmol). The catalyst mixture was transferred via vacuum into the preheated reactor. Ethylene was quickly admitted to 200 psig (1.4 Mpa) and the reactor temperature was maintained at 75° C. via a recirculating water bath. Ethylene was fed on demand via a mass flow controller. Polyethylene yield after 10 minutes reaction was 7.14 g. Mw=745,600, Mw/Mn=2.465.

Example 2

A. The activator of example 1A1d was employed

B. Preparation of diphenylsilane-modified silica (Ph₂HSi—O-Silica)

A pentane (200 ml) slurry of Davison™ 948 (800° C.) silica (20.0 g) was treated with Ph₂SiH₂ (8.67 g; 0.047 mol) and NEt₃ (5.08 g; 0.050 mol) via a syringe under argon at room temperature. Hydrogen gas evolved from the solution vigorously. The resulting mixture was agitated for 12 h. The diphenylsilane-modified silica was collected on a frit under argon, washed with pentane (5×10 ml), and dried under reduced pressure. Yield: 20.87 g. DRIFTS IR: n (Si—H) 2169 cm$^{-1}$ (m). Residual hydroxyl content was undetectable (<0.1 mmol/g silica).

C. Preparation of the diphenylsilane functionalized silica supported anilinium (4-phenyl)tris (pentafluorophenyl)borate ([NHMe₂Ph]⁺[(C₆F₅)₃B (C₆H₄-p-O—SiPh₂—O-Silica)]⁻

A diethylether (30 ml) slurry of diphenylsilane-modified silica (3.00 g) was treated with a diethylether (100 ml) solution of [NHMe₂Ph]⁺[(C₆F₅)₃B (C₆H₄-p-OH)]⁻ (1.00 g; 1.38 mmol) at room temperature under an argon atmosphere. The solution was stirred for 15 h and the resulting white solid was filtered, washed with ether (5×20 ml) and pentane (3×20 mnl), and dried under reduced pressure. Yield was 3.11 g.

D1. Slurry Batch Reactor Polymerization

A 1 gallon Hoppes autoclave purchased from Autoclave Engineers Inc. was initially charged with 1850 grams of anhydrous hexane. The reactor vapor space was then swept twice with a 5 mol percent hydrogen/ethylene gas mixture and vented between each sweep. The reactor was then brought up to 80° C. temperature and then vented to the solvent vapor pressure of 13 psig (190 kPa). The hydrogen/ethylene mixture was then added to increase the reactor pressure to 53 psig. (470 kPa). Ethylene was supplied by a demand feed regulator with a set pressure of 180 psig. (1.3 MPa). The slurry catalyst was prepared by mixing 0.07 g of the diphenylsilane-modified silica supported anilinium borate, [NHMe₂Ph]⁺[(C₆F₅)₃B (C₆H₄-p-O—SiPh₂-OSilica)]⁻), 20 ml of mixed alkanes solvent (Isopar E™ available from Exxon Chemicals Inc., and 0.21 ml (0.0717M, 15 mmol) of a solution of (t-butyl) amidodimethyl(tetramethyl-$\eta^5$-cyclopentadienyl) silanetitanium dimethyl and stirring for 15 minutes. The catalyst slurry was then injected into the reactor via a stainless steel pressurized cylinder. After 60 minutes, the polymer sample was removed from the reactor, filtered, and the powder placed in a drying tray in a vacuum oven at 80° C. for approximately 30 minutes. 20.4 g of polyethylene was isolated (29,800 gPE/gTi).

D2. Solution Batch Reactor Polymerization

A stirred, one gallon autoclave reactor was charged with 1445 g of Isopar E™ and 126 g of 1-octene and heated to 130° C. The reactor was then charged with 37 psig (360 kPa) of hydrogen followed by ethylene sufficient to bring the total pressure to 450 psig. (3.1 Mpa) The catalyst was prepared by stirring 0.15 g of the diphenylsilane-modified silica supported anilinium borate, [NHMe₂Ph]⁺[(C₆F₅)₃B(C₆H₄-p-O—SiPh₂-OSilica)]⁻, 20 ml of Isopar E™, and 0.42 ml of a solution of (t-butyl)amidodimethyl(tetramethyl-$\eta^5$-cyclopentadienyl)-silanetitanium dimethyl (0.0717M, 30 mmol) for 15 minutes. The catalyst slurry was injected into the reactor and the reactor temperature and pressure maintained by continually feeding ethylene during the polymerization and cooling the reactor as required. After 10 minutes, the reactor contents were transferred into a nitrogen purged resin kettle containing 0.2 g of antioxidant (Irganox 1010 available from Ciba Geigy Co.). The sample was dried for 15 h in a vacuum oven to yield 93.4 g of copolymer (65,000 gPE/gTi).

Example 3

B1. Preparation of phenylsilane-modified silica, PhH₂Si-OSilica

Silicas having residual hydroxyl content of 0.5 mmol/g were obtained by calcining various silicas at 800° C. (Davison 948, Davison 952, and Sylopol™-2212, available from GRACE Davison Corporation). 20.0 g of the calcined silicas was slurried in pentane (150 ml) and treated with PhSiH₃ (6 ml; 0.048 mol) and triethylaluminum (6 ml; 0.043 mol) added via a syringe under argon atmosphere at room temperature. Hydrogen gas evolved from the solution vigorously. The resulting mixture was agitated in a shaker for 12 hours. The phenylsilane-modified silicas were collected on a frit under argon, washed with pentane (5×20 ml), and dried under reduced pressure. Yields were approximately 21.0 g. DRIFTS IR: v (Si—H) 2178 cm-1 (vs). $^{29}$Si CPMAS: δ–23 ppm. Residual hydroxyl contents were undetected (<0.1 mmol/g silica).

B2. Preparation of dimethylsilane-modified silica, Me₂HSi-OSilica

A pentane (200 ml) slurry of GRACE Davison 948 (800 C; 0.5 mmol —OH/g) silica (30.0 g) was treated with (Me₂HSi)₂NH (3.0 g; 22.5 mmol). The resulting mixture was agitated in a shaker for 12 hours. The dimethylsilane-modified silica was collected on a frit under argon, washed with pentane (5×20 ml), and dried under reduced pressure. Yield: 30.95 g. DRIFTS IR: v (SiH) 2158 cm-1 (s). $^{29}$Si CPMAS: δ–1.3 ppm.

B3. Preparation of diethylsilane-modified silica, Et₂HSi-OSilica

A toluene (50 ml) slurry of GRACE Davison 948 (800 C; 0.5 mmol —OH/g) silica (2.5 g) was treated with Et₂H₂Si (0.90 g; 97 percent; 10.2 mmol) and NEt₃ (1.05 ml; 7.5 mmol). The resulting mixture was refluxed for 12 hours. The resulting solution was cooled to 25 C. and the diethylsilane-modified silica product was collected on a frit under argon, washed with pentane (5×20 ml), and dried under reduced pressure. Yield: 2.7 g. DRIFTS IR: v (Si—H) 2141 cm$^{-1}$ (s). $^{29}$Si CPMAS: δ+5 ppm.

B4. Preparation of phenylmethylsilane-modified silica, PhMeHSi-OSilica

A heptane (350 ml) slurry of GRACE Davison 948 (800° C.; 0.5 mmol —OH/g) silica (30.0 g) was treated with PhMeH₂Si (9.15 g; 97 percent; 72.8 mmol) and NEt₃ (10.5 ml; 75 mmol). The resulting mixture was refluxed for 12 hours in an overhead stirrer under argon atmosphere. The resulting solution was cooled to 25 C. and the phenylmethylsilane-modified silica product was collected on a frit under argon, washed with pentane (5×30 ml), and dried under reduced pressure. Yield: 31.73 g. DRIFTS IR: v (Si—H) 2160 cm$^{-1}$ (s). $^{29}$Si CPMAS: δ–6 ppm.

B5. Preparation of diphenyisilane-modified silica, Ph$_2$HSi-OSilica

A pentane (150 ml) slurry of GRACE Davison 948 (800° C.; 0.5 mmol —OH/g) silica (20.0 g) was treated with Ph$_2$SiH$_2$ (9 ml; 98 percent; 44.7 mmol) and NEt$_3$ (6.2 ml; 44.5 mmol) through syringe under argon atmosphere at room temperature. Hydrogen gas evolved from the solution vigorously. The resulting mixture was agitated in a shaker for 12 hours. The diphenylsilane-modified silica product was collected on a frit under argon, washed with pentane (5×30 ml), and dried under reduced pressure. Yield: 21.6 g. DRIFTS IR: v (Si—H) 2169 cm$^{-1}$ (s).

C1. Preparation of the silica-supported anilinium borate, w/phenylsilane functionalizer [PhMe$_2$NH]$^+$ [(C$_6$F$_5$)$_3$B(C$_6$H$_4$-p-O—SiHPh-OSilica)]$^-$ An ether (100 ml) slurry of phenylsilane-modified silica (prepared according to 3B1) (10.00 g) was treated with an ether (100 ml) solution of dimethylanilinium (4-hydroxyphenyl)tris(penta-fluorophenyl)borate [PhMe$_2$NH][(C$_6$F$_5$)$_3$B(C$_6$H$_4$-p-OH)] (prepared according to 1A1(a–d)) (2.94 g; 4.03 mmol) at room temperature under an argon atmosphere. The solution was agitated in dry box for 1.5 days and the resulting white solid was filtered off, washed with ether (5×20 ml) and pentane (3×20 ml), and dried under reduced pressure. Yield: 11.99 g. DRIFTS IR: v (Si—H) 2190 cm$^{-1}$ (m); v (N—H) 3239 cm$^{-1}$ (w). $^{29}$Si CPMAS: —O—SiHPh-OSilica (s, -41 ppm). $^{13}$C CPMAS: NHMe$_2$Ph (s, 48.5 ppm). ICP boron content: 0.231 percent.

C2. Preparation of the silica-supported anilinium borate, w/di-methylsilane functionalizer [PhMe$_2$NH]$^+$[(C$_6$F$_5$)$_3$B(C$_6$H$_4$-p-O—SiMe$_2$-Osilica))$^-$ An ether (100 ml) slurry of dimethylsilane-modified silica (10.00 g) (prepared according to 3B2) was treated with an ether (100 ml) solution of [PhMe$_2$NH][(C$_6$F$_5$)$_3$B(C$_6$H$_4$-p-OH)] (2.90 g; 4.02 mmol) at 25° C. under an argon atmosphere. The solution was agitated in a dry box for 2.5 days and the resulting white solid was filtered off, washed with ether (5×20 ml) and pentane (3×20 ml), and dried under reduced pressure. Yield: 12.21 g. v (N—H) 3240 cm$^{-1}$ (w). $^{29}$Si CPMAS: —O—SiHPh-OSilica (s, -7.7 ppm).

C3. Preparation of the silica-supported anilinium borate, w/di-ethylsilane functionalizer [PhMe$_2$NH]$^+$ [(C$_6$F$_5$)$_3$B(C$_6$H$_4$-p-O—SiEt$_2$-Osilica))$^-$ An ether (100 ml) slurry of diethylsilane-modified silica (10.00 g) (prepared according to 3B3) was treated with an ether (100 ml) solution of [PhMe$_2$NH][(C$_6$F$_5$)$_3$B(C$_6$H$_4$-p-OH)] (2.90 g; 4.02 mmol) at 25 C. under an argon atmosphere. The solution was agitated in a dry box for 2.5 days and the resulting white solid was filtered off, washed with ether (5×20 ml) and pentane (3×20 ml), and dried under reduced pressure.

C4. Preparation of the silica-supported anilinium borate, w/phenyl-methylsilane functionalizer [PhMe$_2$NH]$^+$[(C$_6$F$_5$)$_3$B(C$_6$H$_4$-p-O—SiMePh-Osilica))$^-$ An ether (100 ml) slurry of phenylmethylsilane-modified silica (10.00 g) (prepared according to 3B4) was treated with an ether (100 ml) solution of [PhMe$_2$NH][(C$_6$F$_5$)$_3$B(C$_6$H$_4$-p-OH)] (2.90 g; 4.02 mmol) at 25 C. under an argon atmosphere. The solution was agitated in dry box for 2.5 days and the resulting white solid was filtered off, washed with ether (5×20 ml) and pentane (3×20 ml), and dried under reduced pressure.

C5. Preparation of the silica-supported anilinium (4-hydroxyphenyl)tris(pentafluoro-phenyl)borate, w/ diphenylsilane functionalizer [PhMe$_2$NH]$^+$[(C$_6$F$_5$)$_3$B(C$_6$H$_4$-p-O—SiPh$_2$-Osilica))$^-$ An ether (100 ml) slurry of diphenylsilane-modified silica (10.00 g) (prepared according to 3B5) was treated with an ether (100 ml) solution of [PhMe$_2$NH][(C$_6$F$_5$)$_3$B(C$_6$H$_4$-p-OH)] (2.90 g; 4.02 nmmol) at 25 C. under an argon atmosphere. The solution was agitated in dry box for 2.5 days and the resulting white solid was filtered off, washed with ether (5×20 ml) and pentane (3×20 ml), and dried under reduced pressure.

C6. Preparation of silica-supported anilinium (4-(4'-hydroxyphenyl)phenyl)tris(pentafluorophenyl)borate borate, w-phenylsilane functionalizer [PhMe$_2$NH]$^+$ [(C$_6$F$_5$)$_3$B(C$_6$H$_4$-p-O—SiHPh-Osilica)]$^-$ An ether (80 ml) slurry of phenylsilane-modified silica (4.00 g) was treated with dimethylanilinium (4-(4'-hydroxyphenyl)-phenyl)tris(pentafluorophenyl)borate [PhMe$_2$NH]$^+$[(C$_6$F$_5$)$_3$B(C$_6$H$_4$-p-OH)]$^-$ (prepared according to 1A2(a–d)) (1.20 g; 1.49 mmol) at 25 C. under an argon atmosphere. The solution was agitated in dry box for 2 days and the resulting white solid was filtered off, washed with ether (5×20 ml) and pentane (3×20 ml), and dried under reduced pressure. Yield: 5.04 g. DRIFTS IR: v (Si—H) 2191 cm$^{-1}$ (m): v (N—H) 3244 cm$^{31}$ $^1$ (w). $^{29}$Si CPMAS: —O—SiHPh-OSilica (s, -41 ppm). $^{13}$C CPMAS: NHMe$_2$Ph (s, 47.7 ppm). ICP boron content: 0.225 percent

C7. Preparation of the dimethylsilane functionalized silica-supported dimethylanilinium (4-(4'hydroxyphenyl)phenyl)tris(pentafluoro-phenylborate, [PhMe$_2$NH]$^+$[(C$_6$F$_5$)$_3$B(C$_6$H$_4$-p-O—SiMe$_2$-OSilica)]$^-$ An ether (60 ml) slurry of dimethylsilane-modified silica (1.0 g) was treated with [PhMe$_2$NH]$^+$[(C$_6$F$_5$)$_3$B(C$_6$H$_4$—C$_6$H$_4$-p-OH)]$^-$ (0.39 g; 0.49 mmol) at room under an argon atmosphere. The solution was agitated in dry box for 2 days and the resulting white solid was filtered off, washed with ether (3×20 ml) and pentane (3×10 ml), and dried under reduced pressure. Yield: 1.20 g. DRIFTS IR: v (N—H) 3142 cm$^{-1}$ (w). $^{29}$Si CPMAS: —O—SiHPh-OSilica (s, -7.6 ppm). ICP boron content: 0.232 percent.

D. Slurry Batch Reactor Polymerization

1) Copolymerization

A 2 liter autoclave reactor was evacuated at 70° C. for 90 minutes prior to use. Heptane (550 ml) containing 13 µmole of triisobutylaluminum (0.013 ml; 1.0 M in toluene) was divided into two approximately equal portions and placed into two 600 ml high pressure containers. One container was treated with 35 ml of 1-hexene. The second container was treated with 0.2 ml of a toluene solution of bis(n-butylcyclopentadienyl)zirconium dichloride (n-BuCp)$_2$ZrCl$_2$, (0.2 mg; 0.494 µmole) and the activated support of 3C1 (12 mg; 2.4 µmole based on boron). The hexene containing solution was transferred into the preheated reactor followed by the catalyst mixture. Ethylene was quickly admitted at 125 psi (860 kPa) and the reactor was maintained at 70° C. via a recirculating water bath. Ethylene was fed on demand via a mass flow controller. The reaction was continued under these reaction conditions for one hour. Polymer yield was 97 g, giving a productivity (g polymer/g Zr-hr.) of $2.15 \times 10^6$, and a catalyst activity (g polymer/g catalyst-hr.) of 7950.

D2–6) Additional Batch Slurry Polymerizations

The reaction conditions of Example 3D1 were substantially repeated using different quantities of bis(n-butylcyclopentadienyl)-zirconium dichloride, triisobutyl aluminum (TIBAL) and hexene as well as different types and quantities of activated supports. Results are contained in Table 1.

TABLE 1

| Run | Complex mg (μmol) | Activated Support | TIBAL μmol | hexene ml | Yield g | Prod.[1] (×10⁶) | Act.[2] |
|---|---|---|---|---|---|---|---|
| 3D2 | 0.2 (0.5) | 3C2 | 12 | 35 | 41 | 0.9 | 3360 |
| 3D3 | 0.2 (0.5) | 3C2 | 13 | 35 | 40 | 0.9 | 3570 |
| 3D4 | 0.4 (1.0) | 3C6 | 20 | 40 | 137 | 1.5 | 6720 |
| 3D5 | 1.0 (2.5) | 3C7 | 30 | 20 | 87 | 0.4 | 2810 |
| 3D6 | 0.2 (0.5) | 3C6 | 13 | 70 | 73 | 1.6 | 5530 |

[1]Productivity g polymer/g Zr-hr
[2]Activity g polymer/g catalyst-hr.

D7) Ethylene Homopolymerization a) A 2 liter autoclave reactor was evacuated at 70° C. for 90 minutes prior to use. Heptane (350 ml) containing 25 μmole of triisobutylaluminum (0.025 ml; 1.0 M in toluene) and 1.0 ml of a toluene solution of bis(cyclopentadienyl) zirconium dimethyl Cp$_2$ZrMe$_2$, (0.9 mg; 3.7 μmole) and the activated support of 3C6 (30 mg; 5.0 μmole based on boron was transferred into the preheated reactor. Ethylene was quickly admitted at 180 psi (1200 kPa) and the reactor was maintained at 80° C. via a recirculating water bath. Ethylene was fed on demand via a mass flow controller. The reaction was continued under these reaction conditions for one hour. Polymer yield was 160 g. Mw=155,000, Mw/Mn=2.05, Tm (DSC) was 138° C.

b) The reaction conditions of 3D3a) were substantially repeated excepting that the quantity of triisobutyl aluminum was 50 μmol, the transition metal compound was biscyclopentadienylzirconium dichloride, (2 mg, 6.8 μmol), the activated support was 3C6 (60 mg, 12 μmol based on boron), and the temperature was maintained at 75° C. Polymer yield was 139 g. Mw=144,000, Mw/Mn=2.41, Tm (DSC) was 135° C.

c) The reaction conditions of 3D23) were substantially repeated excepting that the quantity of triisobutyl aluminum was 100 μmol, the transition metal compound was (t-butylamido)dimethyl(tetramethyl-η$^5$-cyclopentadienyl) silanetitanium dichloride, (10 mg, 27.2 μmol), the activated support was 3C1 (200 mg, 40 μmol based on boron), and the ethylene pressure was 200 psi (1400 kPa). Polymer yield was 94.2 g. Mw=961,000, Mw/Mn=2.00, Tm (DSC) was 135° C.

d) The reaction conditions of 3D3a) were substantially repeated excepting that the quantity of triisobutyl aluminum was 50 μmol, the transition metal compound was bisindenylzirconium dichloride, (2 mg, 4.8 μmol), and the activated support was 3C1 (80 mg, 13 μmol based on boron. Polymer yield was 140 g.

Example 4

C. Preparation of phenylsilane functionalized silica supported anilinium (6-hydroxy-2-naphthyl)tris (pentafluorophenyl)borate, [PhMe$_2$NH]$^+$[silica-OSiPhH—O-6-C$_{10}$H$_6$-2-B(C$_6$F$_5$)$_3$]$^-$ A mixture of 1.67 g [PhMe$_2$NH]$^+$[6-HOC$_{10}$H$_6$-2-B(C$_6$F$_5$)$_3$] (prepared according to Example 1A3) and 5.0 g phenylsilane-modified silica (prepared according to Example 1B) were heated at gentle reflux with mechanical stirring for 24 hours. The solids were collected by filtration, washed with Et$_2$O and pentane, and dried under reduced pressure. CP-MAS $^{29}$Si NMR: –43 ppm. Solids were determined to be 0.154 weight percent boron.

D. Slurry Batch Reactor Polymerizations

D1. A 2-L autoclave was evacuated at 80° C. overnight prior to use. A heptane (300 mL) slurry of phenylsilane modified-silica supported dimethylanilinium (6-hydroxy-2-naphthyl)tris(pentafluoro-phenyl)borate [PhMe$_2$NH]$^+$ [silica-OSiPhH—OC$_{10}$H$_6$-2-B(C$_6$F$_5$)$_3$]$^-$ (0.100 g), (t-butylamido)dimethyl(tetramethyl-η$^5$-cyclopentadienyl) silanetitanium dimethyl (5 mg), and 0.1 mL of a 25 percent Et$_3$Al solution in heptane were transferred into the preheated reactor. Ethylene was quickly injected to 180 psi (1200 kPa) and the reactor was maintained at 80° C. via a recirculating water bath. Ethylene was fed on demand via a mass flow controller. Polyethylene yield after 60 minutes was 50 g.

D2. The procedure of example 4D1) was repeated with the following changes: 0.05 g [PhMe$_2$NH]$^+$[silica-OSiPhH—OC$_{10}$H$_6$-2-B(C$_6$F$_5$)$_3$]$^-$, 0.05 mL Et$_3$Al solution, 1.5 mg Cp$_2$ZrMe$_2$, and 3 psi (20 kPa) H$_2$. Polyethylene yield alter 60 minutes was 144 g.

D3–22. The previous reaction conditions were substantially repeated using transition metal complexes, activated supports, and other reaction conditions indicated in Table 2. Results are contained in Table 2. Molecular weights were determined by gel permeation chromatography (GPC).

TABLE 2

| Run | Support | complex (μmol) | Scav. (mmol) | C$_8$H$_{16}$[1] ml | H$_2$ kPa | time min. | Yield (g) | Mw ×10⁻⁶ | Mw/Mn |
|---|---|---|---|---|---|---|---|---|---|
| 4D3 | 4C | TM[2] (30) | TEA[3] (1.5) | 0 | 14 | 60 | 48 | — | — |
| 4D4 | " | TP[4] (30) | TEA (1.5) | " | " | " | 74 | 1.13 | 6.1 |
| 4D5 | " | " | TEA (.75) | " | " | " | 62 | 1.08 | 4.9 |
| 4D6 | " | " | TEA (.38) | " | " | " | 46 | 1.03 | 4.9 |
| 4D7 | " | " | TEA (.05) | " | " | " | 9 | — | — |
| 4D8 | " | " | TEA (1.5) | " | " | " | 61 | — | — |
| 4D9 | " | " | MAO[5] (.05) | " | " | " | 4 | — | — |
| 4D10 | " | " | TEA (1.5) | " | 35 | " | 52 | 0.73 | 5.8 |
| 4D11 | " | " | TEA (1.5) | " | 60 | " | 52 | 0.79 | 4.9 |
| 4D12 | 1C | " | TEA (1.5) | " | 280 | " | 39 | 0.40 | 13.5 |
| 4D13 | " | " | TEA (1.5) | " | " | " | 26 | — | — |
| 4D14 | " | TP (54) | TEA (1.5) | " | 14 | 42 | 214 | — | — |
| 4D15 | " | TP (45) | TEA (1.5) | 50 | 28 | 60 | 98 | 0.60 | 7.3 |

TABLE 2-continued

| Run | Support | complex (μmol) | Scav. (mmol) | $C_8H_{16}$[1] ml | $H_2$ kPa | time min. | Yield (g) | Mw ×10$^{-6}$ | Mw/Mn |
|---|---|---|---|---|---|---|---|---|---|
| 4D16 | " | TP (45) | TEA (1.5) | 25 | 34 | " | 125 | 0.80 | 6.2 |
| 4D17 | " | TP (90) | TEA (1.5) | 50 | 70 | " | 62 | 0.40 | 14.2 |
| 4D18 | " | TP (90) | TEA (1.5) | 35 | " | " | 240 | 0.75 | 8.6 |
| 4d19 | " | ZC[6] (68) | TBAL[7] (.7) | | 140 | " | 106 | 0.04 | 2.0 |
| 4d20 | " | RI[8] (5) | TBAL (.2) | | " | 30 | 169 | — | — |
| 4D21 | 3C6 | ZB[9] (10) | TBAL (.2) | 0 | " | " | 4 | — | — |
| 4D22 | 4C | " | TBAL (.2) | 30 | " | " | 142 | — | — |

[1] 1-octene
[2] (t-butylamido)dimethyl(tetramethyl-$\eta^5$-cyclopentadienyl)silanetitanium dimethyl
[3] triethylaluminum
[4] (t-butylamido)dimethyl(tetramethyl-$\eta^5$-cyclopentadienyl)silanetitanium (II) 1,3-pentadiene
[5] triisobutylaluminum modified methylalumoxane
[6] biscyclopentadienylzirconium dichloride
[7] triisobutylaluminum
[8] rac-bis(indenyl)zirconium (II) 1,4-diphenylbutadiene (prepared by reduction of the corresponding dichloride in the presence of 1,4-diphenyl-1,3-butadiene).
[9] bis(n-butylcyclopentadienyl)zirconium dichloride Example 5

Preparation of dimethylsilane-modified alumina 5.0 g of Pural™ 200 alumina (available from Condea Chemie AG (calcined at 600° C. under vacuum) was slurried in 25 mL of pentane, and 4.5 mL (5 mmol/g) HMe$_2$SiNHSiMe$_2$H was added. The mixture was shaken for 15 hours. The solids were collected on a fritted funnel, washed with pentane, and dried under reduced pressure. DRIFTS IR: 2958, 2904 (C—H), 2102 (br, Si—H) cm$^{-1}$.

Preparation of the activated support by reaction of dimethylsilane functionalized alumina with dimethylanilinium 4-(hydroxyphenyl)-tris (pentafluorophenyl)borate, [PhMe$_2$NH]$^+$[(C$_6$F$_5$)$_3$B (C$_6$H$_4$-p-OSiMe$_2$O-alumina)]$^-$ 1.0 g dimethylsilane-modified alumina was slurried with 0.35 g [PhMe$_2$NH]$^+$[(C$_6$F$_5$)$_3$B(C$_6$H$_4$-p-OH)] in 10 mL Et$_2$O for 12 hours. At this time the solids were collected by filtration, washed with Et$_2$O and pentane, and dried under reduced pressure. DRIFTS IR: 2960, 2908 (C—H) 2131 (Si—H), 1641, 1623, 1591, 1514, 1461, 1261 (aromatic ring breathing) cm$^{-1}$.

Slurry Batch Reactor Polymerization

A 2-L autoclave was evacuated at 80° C. overnight prior to use. A heptane (300 mL) slurry of PhMe$_2$NH[(C$_6$F$_5$)$_3$B (C$_6$H$_4$-p-OSiMe$_2$O-alumina)] (0.200 g), Cp$_2$ZrMe$_2$ (10), and 0.2 mL of a 25 percent Et$_3$Al solution in heptane were transferred into the preheated reactor. Ethylene was quickly injected to 180 psi (1200 kPa) and the reactor was maintained at 80° C. via a recirculating water bath. Ethylene was fed on demand via a mass flow controller. Polyethylene yield after 60 minutes was 2.16 g.

Example 6

D1–5 Continuous Slurry Polymerization

A continuous slurry polymerization was carried out using a computer controlled 10 L slurry reactor equipped with an external water jacket, a stirrer, a thermocouple, a catalyst addition dip-tube, diluent addition dip-tube, and a continuous capacitance, level detector probe. Purified isopentane diluent was set to a constant flow of 4000 g/hr which resulted in maintaining a solids content in the reactor of approximately 60 weight percent. The reactor level was maintained at approximately 60 percent of the reactor volume by periodic removal of the reactor contents. The reactor was heated to a temperature of 55° C. A hydrogen flow of 0.15 L/hr, an ethylene flow of 650 g/hr and a 1-butene flow of 75 g/hr were initiated and the reactor pressure set to 220 psi (1.5 Mpa). The catalyst mixture was prepared by combining 81 mg (200 μmol) of (n-BuCp)$_2$ZrCl$_2$, 4.90 g of phenylsilane modified silica supported dimethylanilinium 4-(4'-hydroxyphenyl)phenyl)tris(pentafluorophenyl)borate prepared according to preparation 3C6, and 2 mmol triisobutylaluminum (TIBA) in 800 mL of hexane in the dry box and placing the mixture in a 1 L bomb. The contents were then transferred under nitrogen to the stirred catalyst vessel and diluted to 8 L with isopentane. The catalyst mixture was slowly added to the reactor from the continuously stirred catalyst tank. The ethylene and 1-butene flows were then incrementally increased. A portion of the reactor contents was periodically passed by means of exit valves to a heated flash vessel wherein diluent was removed. The devolatilized polymer's properties were measured and recorded. The reactor was operated continuously over an 8 hour period. The data reported in Table 3 were measured on samples obtained after the reactor reattained equilibrium following a change in process conditions.

TABLE 3

| Run | $C_2H_4$ g/hr | $C_4H_8$ g/hr | Kg PE g Ti | yield (g) | I2 dg/min | Mw ×10$^{-6}$ | Mw/Mn | Density (δ) g/cc | $C_4H_8$ mol % | Bulk δ g/cc |
|---|---|---|---|---|---|---|---|---|---|---|
| 6D1 | 650 | 75 | 0.36 | 206 | 0.06 | | | 0.9471 | <0.2 | |
| 6D2 | 850 | 100 | 0.51 | 339 | 0.6 | | | 0.9354 | 0.57 | |
| 6D3 | 850 | 100 | 0.51 | 320 | 2.22 | 0.101 | 2.21 | 0.9321 | 1.16 | 0.35 |
| 6D4 | 1000 | 138 | 0.64 | 414 | 2.71 | | | 0.9310 | 1.52 | |
| 6D5 | 1000 | 138 | 0.64 | | 1.46 | 0.125 | 2.93 | 0.9316 | | 0.32 |

D6–14 Continuous Slurry Polymerizations

Preparation of bis(n-butylcyclopentadienyl) zirconium (1,4-diphenylbutadiene)

Under nitrogen, recrystallized bis(n-butylcyclopentadienyl)zirconium dichloride (2.02 g, 4.99 mmol) was slurried in hexane with 1,4-diphenyl butadiene. A solution of n-BuLi in hexanes (2.5 M, 2.05 mL, 5.13 mmol) was added and a deep red color formed immediately. After stirring for 30 minutes at room temperature, the mixture was refluxed for 2 h. The solvent was removed in vacuo and the solid redissolved in about 20 mL of hot hexane. Red crystals formed. A small amount of hexane was added and the reaction flask was cooled in a freezer and then filtered through a medium frit. The red crystals were isolated via filtration through a medium frit funnel, washed once with cold hexane, and dried in vacuo (2.04 g, 76.5 percent yield).

Polymerizations

The reaction conditions of Examples 6D1–5 were substantially repeated excepting that the purified isopentane was set to a constant flow of 2500 g/hr, the reactor temperature was 65° C., and the initial ethylene and 1-butene flows were 1000 g/hr and 50 g/hr respectively. The initial catalyst mixture was prepared by combining 40.5 mg (100 µmol) of (n-BuCp)$_2$ZrCl$_2$, 2.45 g of phenylsilane modified silica supported dimethylanilinium 4-(4'-hydroxyphenyl)phenyl tris(pentafluorophenyl)borate prepared according to preparation 3C6, and 1 mmol TIBA in 400 mL of hexane in the dry box and placing the mixture in a 1 L bomb. The contents were then transferred under nitrogen to the stirred catalyst vessel and diluted to 8 L with isopentane. The catalyst mixture was slowly added to the reactor from a continuously stirred catalyst tank. The ethylene and 1-butene flows were then incrementally changed. A second, stirred catalyst vessel was prepared in the same manner as above described and the two catalyst vessels were switched back and forth every 3–5 hr during the 34 hour polymerization. During the polymerization the metallocene catalyst precursor was changed to bis(n-butylcyclopentadienyl)zirconium (II) (1,4-diphenylbutadiene), (n-BuCp)$_2$Zr(PhCH=CHCH=CHPh). Results are shown in Table 4.

Example 7

B Preparation of triisobutylaluminum treated phenylsilane modified silica

B1. Phenylsilane modified silica was prepared substantially according to the procedure of Example 1B excepting the silica was Sylopol™ 2212 silica and the calcining temperature was 400° C. A heptane (200 ml) slurry of this phenylsilane modified silica (10 g), was treated with TIBA (20 ml, 1M in toluene) at room temperature. The resulting mixture was agitated in a shaker for 12 h and was then filtered, washed with pentane (3×50 ml), and dried in vacuo. Yield: 11.3 g. DRIFTS IR: v (Si—H) 2170 cm$^{-1}$ (m). $^{29}$Si CPMAS: d −24 ppm.

B2. The above reaction conditions were substantially repeated excepting that the silica (Sylopol™ 2212) was calcined at 800° C.

B3. The above reaction conditions were substantially repeated excepting that the silica (Sylopol™ 2212) was calcined at 500° C.

B4. The above reaction conditions were substantially repeated excepting that the silica (Sylopol™ 2212) was calcined at 300° C.

C. Preparation of triisobutylaluminum treated, phenylsilane modified silica-supported N,N-dimethyl anilinium (4-(4'-hydroxyphenyl)phenyl) trispentafluorophenyl-borate-[PhMe$_2$NH]$^+$[(C$_6$F$_5$)$_3$B (C$_6$H$_4$—C$_6$H$_4$-p-O—SiPhH—OSi)]$^-$ C1. A diethylether (200 mnl) slurry of the TIBA modified phenylsilane silica (7B1) was treated with [PhMe$_2$NH][(C$_6$F$_5$)$_3$B(C$_6$H$_4$—C$_6$H$_4$-p-OH)] (3.01 g; 3.75 mmol) at room temperature under argon atmosphere. The solution was agitated in dry box for 2 days and the resulting white solid was filtered off, washed with ether (3×50 ml) and pentane (3×10 ml), and dried in vacuo. Yield: 11.25 g. ICP boron content: 0.244 wt percent.

C2. The preparation of C1 was substantially shortened (2–3 hours reaction time) using hot toluene in place of diethyl ether.

C3. The preparation of C1 was substantially repeated using the triisobutylaluminum treated phenylsilane modified silica of 7B4.

D. Ethylene Homopolymerizations

D1. A 2 liter autoclave reactor was evacuated at 75° C. for 90 min prior to use. A supported tethered catalyst was prepared by combining TIBA (100 mmole; 0.1 ml; 1.0 M in toluene), heptane (~500 ml) and bis(n-butylcyclopentadienyl)zirconium dichloride ("BuCp)$_2$ZrCl$_2$ (0.1 mg, 0.247 mmol), followed by the addition of the TIBA treated, phenylsilane modified silica supported anilinium (4-(4'-hydroxyphenyl)phenyl)-tris(pentafluorophenyl) borate of 7C1 (7 mg; 1.58 mmol). The catalyst mixture was transferred into the preheated reactor via vacuum line. Ethylene was quickly admitted to 180 psi (1.2 Mpa), and the reactor was maintained at 75° C. via a recirculating water bath. Ethylene was fed on demand via a mass flow control-

TABLE 4

| Run | Cat. | H$_2$ g/hr | C$_2$H$_4$ g/hr | Kg PE g Ti | I2 dg/min | Mw ×10$^{-6}$ | Mw/Mn | Density (δ) g/cc | C$_4$H$_8$ mol % | Bulk δ g/cc |
|---|---|---|---|---|---|---|---|---|---|---|
| 6D6 | Zr(IV)$^1$ | 0.15 | 100 | 0.61 | 0.306 | | | 0.9389 | | |
| 6D7 | Zr(IV) | 0.15 | 100 | 0.61 | 0.325 | | | 0.9359 | | |
| 6D8 | Zr(IV) | 0.15 | 100 | 0.61 | 1.638 | | | 0.9304 | | |
| 6D9 | Zr(IV) | 0.15 | 100 | 0.61 | 2.099 | | | 0.9285 | 1.54 | 0.37 |
| 6D10 | Zr(IV) | 0.15 | 100 | 0.61 | 2.408 | 0.092 | 2.098 | 0.9305 | 1.70 | 0.37 |
| 6D11 | Zr(IV) | 0.075 | 172 | 1.00 | 5.24 | 0.075 | 2.1 | 0.9242 | 2.79 | 0.36 |
| 6D12 | Zr(II)$^2$ | 0.075 | 172 | 0.80 | 4.57 | 0.076 | 2.073 | 0.9230 | 2.86 | 0.35 |
| 6D13 | Zr(II) | 0.075 | 172 | 0.80 | 3.085 | 0.083 | 2.181 | 0.9141 | 4.76 | 0.35 |
| 6D14 | Zr(II) | 0.075 | 250 | 0.81 | 2.058 | 0.092 | 2.197 | 0.9126 | 4.82 | 0.34 |

$^1$bis(n-butylcyclopentadienyl)zirconium dichloride
$^2$bis(n-butylcyclopentadienyl)zirconium (1,4-diphenylbutadiene)

ler. Polymer yield: 180 g (1 hr). $M_w$=169,000, $M_w/M_n$=2.11. Productivity: 8.0×10⁶ g.PE/g.Zr.h.

D2. The reaction conditions of 7D1 were substantially repeated excepting that the tethered borate support was phenylsilane modified silica supported anilinium (4-(4'-hydroxyphenyl)phenyl)tris(pentafluoro-phenyl)borate (Sylopol™ 2212 silica, 500° C. calcining temperature (7B3)). The quantities of reagents used were: ("BuCp)$_2$ZrCl$_2$ (0.2 mg, 0.494 mmol), TIBA (100 mmole; 0.1 ml; 1.0 M in toluene), and tethered borate (12 mg; 1.97 mmol). Polymer yield: 204 g (1 hr). $M_w$=184,000, $M_w/M_n$=2.38. Productivity: 4.5×10⁶ g.PE/g.Zr.h.

D3. The reaction conditions of 7D1 were substantially repeated excepting that the tethered borate support was phenylsilane modified silica supported anilinium (4-hydroxyphenyl)tris(pentafluoro-phenyl)borate (Sylopol™ 2212 silica, 800° C. calcining temperature (7B2)). The quantities of reagents used were: ("BuCp)$_2$ZrCl$_2$ (0.2 mg, 0.494 mmol), TIBA (100 mmole; 0.1 ml; 1.0 M in toluene), and tethered borate (13.5 mg; 2.16 mmol). Polymer yield: 208 g (1 hr). $M_w$=156,000, $M_w/M_n$=2.09. Productivity: 4.6×106 g.PE/g.Zr.h.

D4. A 2 liter autoclave reactor was evacuated at 80° C. for 90 min prior to use. TIBA (350 mmole; 0.35 ml; 1.0 M in toluene) was added to heptane (~500 ml) and the solution treated with (t-butylamido)dimethyl-(tetramethyl-$\eta^5$-cyclopentadienyl)silane-titanium dichloride (0.5 mg, 1.36 mmol) followed by the addition of the tethered borate of 7C1 (40 mg; 8.5 mmol). The catalyst mixture was transferred into the preheated reactor via vacuum lines. Ethylene was quickly admitted to 200 psi (1.4 Mpa) and the reactor was maintained at 80° C. via a recirculating water bath. Ethylene was fed on demand via a mass flow controller. Polymer yield: 67.7 g (1 hr). Mw=3.22×10⁶, Mw/Mn=2.96. Productivity: 1.0×10⁶ g.PE/g Ti.h D5. The reaction conditions of 7D4 were substantially repeated using the metallocene ethylenebis(indenyl) zirconium dichloride and the triisobutylaluminum treated, phenylsilane modified silica supported borate of 7C3. The reagents were: (EBI)ZrCl$_2$ (0.13 mg, 0.319 mmol), TIBA (100 mmole; 0.1 ml; 1.0 M in toluene), and TIBA treated, phenylsilane modified, silica supported tethered borate (9.8 mg; 1.54 mmol). Polymer° yield: 170 g (1 hr). $M_w$=130,000 $M_w/M_n$=2.63. Productivity: 5.9×10⁶ g.PE/g.Zr.h.

What is claimed is:

1. A support for use in preparing supported catalysts for addition polymerizations comprising the reaction product of:

(A) an inorganic oxide material comprising a solid matrix selected from the group consisting of porous silicas, aluminas, aluminosilicates, aluminophosphates, clays, titanias, and mixtures thereof, and reactive silane functionalized derivatives of hydroxyl groups on the surface thereof, said reactive silane functionalized derivatives of hydroxyl groups corresponding to the formula:

—OSiR$_2$H, wherein R, independently each occurrence, is hydrogen, or $C_{1-20}$ hydrocarbyl, said inorganic oxide material comprising less than 1.0 mmol of hydroxyl groups per gram, and (B) an activator compound comprising:
b$_1$) a cation which is capable of reacting with a transition metal compound to form a catalytically active transition metal complex, and b$_2$) a compatible anion containing at least one substituent able to react with the silane functionalized derivatives of hydroxyl groups on the surface of the inorganic oxide material, thereby covalently bonding the compatible anion to the support.

2. A support according to claim 1 wherein the inorganic oxide is silica.

3. A support according to claim 1 wherein the activator compound is a salt of the formula:

$(G^{+e})(DM'Q_3)^-_e$, wherein $G^{+e}$ is the cationic remnant of a Bronsted acid salt, an oxidizing cation, a carbonium ion or a silylium ion;

$[DM'Q_3]^-$ is a noncoordinating, compatible anion,

D is a linking group comprising a functional group capable of reaction with the inorganic oxide material, with residual hydroxyl functional group, thereof, or with said reactive silane functionalized derivatives of hydroxyl groups thereof, M' is boron or aluminum in an oxidation state of 3;

Q is a hydrocarbyl-, hydrocarbyloxy-, fluorinated hydrocarbyl-, fluorinated hydrocarbyloxy-, or fluorinated silylhydrocarbyl group of up to 20 nonhydrogen atoms, and e is an integer from 1 to 3.

4. A support according to claim 3 wherein e is 1.

5. A support according to claim 3 where:

M' is boron; and

Q is pentafluorophenyl.

6. A support according to claim 1 wherein the anion of the activator is selected from the group consisting of tris (pentafluorophenyl)(4-hydroxyphenyl)borate, tris-(2,4-difluorophenyl)(4-hydroxyphenyl)borate, tris-(3,5-difluorophenyl)(4-hydroxyphenyl)borate, tris-(3,5-di-trifluoromethylphenyl)(4-hydroxyphenyl)borate, tris (pentafluorophenyl(2-hydroxyethyl)borate, tris (pentafluorophenyl))(4-hydroxybutyl)borate, tris (pentafluoro-phenyl)(4-hydroxycyclohexyl)borate, tris (pentafluorophenyl)(4-hydroxy-2,6-dimethylphenyl)borate, tris(pentafluorophenyl)4-(4'-hydroxyphenyl)phenylborate, tris(pentafluorophenyl)4-(4'-hydroxy-2',6'-dimethylphenyl) phenylborate, and tris(pentafluorophenyl)(6-hydroxy-2-naphthyl)borate.

7. A supported catalyst comprising the support of claim 1 and (C) a transition metal compound containing at least one π-bonded anionic ligand group and a substituent capable of reacting with the activator compound to thereby form a catalytically active transition metal complex.

8. A supported catalyst according to claim 7 wherein the π-bonded anionic ligand group of the transition metal compound (C) is a conjugated or nonconjugated, cyclic or non-cyclic dienyl group, an allyl group, aryl group, or a substituted derivative thereof.

9. A supported catalyst according to claim 8 wherein the π-bonded anionic ligand group is a cyclopentadienyl group or a substituted derivative thereof.

10. A supported catalyst according to claim 7 wherein the transition metal is titanium, zirconium or hafnium.

11. A supported catalyst according to claim 7 additionally comprising an alumoxane, or a hydrocarbylaluminum compound according to the formula AlR$_3$ wherein R is $C_{1-20}$ hydrocarbyl or hydrocarbyloxy.

12. An addition polymerization process wherein one or more addition polymerizable monomers are contacted with a supported catalyst according to claim 7 under addition polymerization conditions.

13. The addition polymerization process according to claim 12 carried out under slurry or gas phase polymerization conditions.

14. A gas phase addition polymerization process according to claim 13 wherein condensed monomer or inert diluent is present.

* * * * *

UNITED STATES PATENT AND TRADEMARK OFFICE
CERTIFICATE OF CORRECTION

PATENT NO : 6,087,293

DATED : July 11, 2000

INVENTOR(S) : Edmund M. Carnahan, et al

It is certified that error appears in the above-identified patent and that said Letters Patent are hereby corrected as shown below:

Cover page, column 2, line 3 of the Abstract, following "comprising" insert —on the surface thereof—.

Cover page, column 2, line 4 of the Abstract, delete "surface" and insert —silane functionalized derivatives of—.

Cover page, column 2, lines 4 through 6 of the Abstract, delete "at least some of said hydroxyl groups optionally having been functionalized an converted to a reactive silano moiety".

Cover page, column 2, line 8 of the Abstract, delete "or $C_{1-20}$ hydrocarbyloxy".

Cover page, column 2, line 9 of the Abstract, following "oxide" insert —material—.

Cover page, column 2, line 9 of the Abstract, delete "or functionalized derivative thereof".

Cover page, column 2, line 15 of the Abstract, following "the" insert —reactive silane functionalized derivatives of hydroxyl groups on the surface—.

Cover page, column 2, lines 15 and 16 of the Abstract, delete "inorganic oxide, with residual hydroxyl functionality".

Cover page, column 2, line 17 of the Abstract, following "oxide" insert —material—.

Cover page, column 2, line 17 of the Abstract, delete "or with the reactive silane moiety"

UNITED STATES PATENT AND TRADEMARK OFFICE
CERTIFICATE OF CORRECTION

PATENT NO : 6,087,293

DATED : July 11, 2000

INVENTOR(S) : Edmund M. Carnahan, et al

It is certified that error appears in the above-identified patent and that said Letters Patent are hereby corrected as shown below:

Cover page, column 2, line 17 of the Abstract, "hereby" should correctly read --thereby--.

Cover page, column 2, line 19 of the Abstract, delete "process of manufacture".

Column 30, claim 3, line 19, "hydroxyl functional" should correctly read --hydroxylfunctional--.

Column 30, claim 3, line 19, "thereof" should correctly read --thereon--.

Signed and Sealed this

Twenty-second Day of May, 2001

*Attest:*

NICHOLAS P. GODICI

*Attesting Officer*     Acting Director of the United States Patent and Trademark Office